INVENTOR.
Charles Strohmeyer, Jr.
BY
his ATTORNEY

INVENTOR
Charles Strohmeyer, Jr.
BY
his ATTORNEY

United States Patent Office 3,578,563
Patented May 11, 1971

3,578,563
FLUID COOLANT APPARATUS FOR A NUCLEAR REACTOR
Charles Strohmeyer, Jr., Bern Township, Berks County, Pa., assignor to Electrodyne Research Corporation, Reading, Pa.
Continuation-in-part of application Ser. No. 653,475, July 14, 1967. This application Dec. 22, 1967, Ser. No. 693,004
Int. Cl. G21c 15/02
U.S. Cl. 176—51                               6 Claims

ABSTRACT OF THE DISCLOSURE

The invention provides an apparatus for cooling a nuclear reactor wherein there are two systems for flowing a coolant fluid, one system having multiple conduits in parallel relationship with and individually encompassing a portion of the longitudinally disposed nuclear fuel elements, the other system cooling the exterifor walls of the multiple conduits and wherein means are provided for controlling fluid flow selectively in each of the two systems.

---

Figure 1:
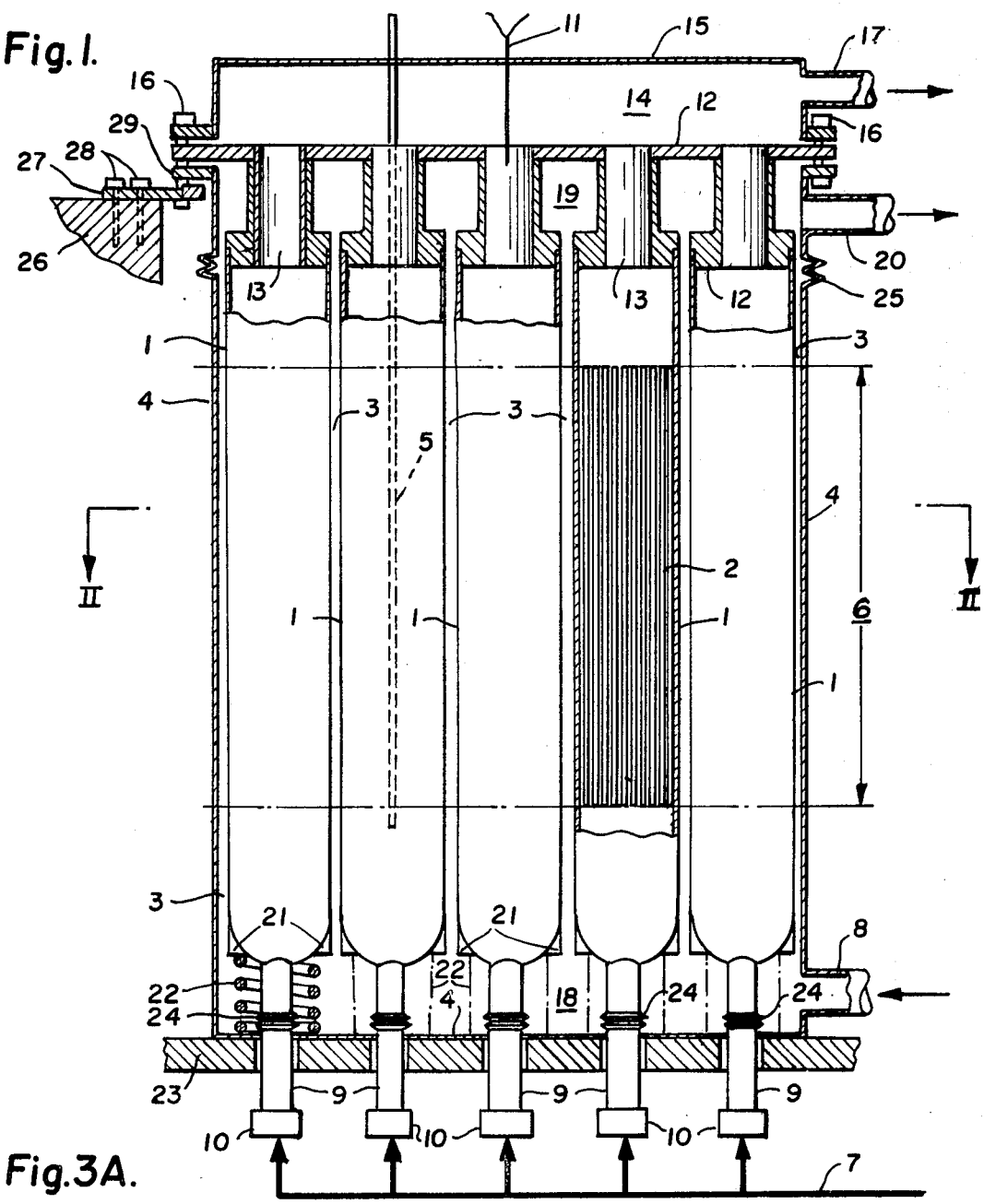

This invention provides an apparatus for cooling a nuclear reactor. This application is a continuation-in-part of United States Patent application Ser. No. 653,475 filed July 14, 1967.

In the past it has been difficult to obtain high level energy from a nuclear reactor for use in a heat consuming power producer. High temperature heat transfer between the nuclear fuel and coolant fluid has created problems associated with containment and/or distribution of the coolant fluid within the reactor coolant fluid circuits and/or maximum temperature at which the reactor coolant fluid can be contained.

Even though the nuclear fuel elements are provided with a protective cladding (e.g. stainless steel shell), there is a tendency for the cladding isolation integrity to fail and radio-active contamination of the coolant fluid results at the points where the nuclear fuel comes in direct contact with the coolant fluid. When the reactor coolant fluid becomes contaminated its use in a power producer introduces access, shielding or containment problems associated with the power producer. This requires that some interposing means between the reactor circuits and power producer be provided to minimize contamination in the power producer such as secondary or secondary and tertiary cycles in combination cascading heat from the reactor primary coolant cycle to the secondary cycle and to the tertiary cycle where employed before steam is delivered to the power producer. Heat exchange between the multiple cascading, recirculating fluid cycles required costly heat transfer equipment.

Where the reactor coolant is liquid sodium at high temperature, distribution of fluid flow with respect to power density within the reactor is a problem, contamination in the reactor coolant circuit is high, circulation ratio of primary coolant fluid within the reactor is high and differential temperature of the coolant fluid through the reactor tends to be minimal requiring a high temperature containment structure for the coolant fluid in the case where high level energy for a power producer is generated from the heat absorbed by the reactor primary coolant circuit. A secondary sodium cycle in heat exchange with the primary coolant cycle is normally employed to reduce contamination in the secondary cycle so that heat may be exchanged safely between the secondary sodium cycle and a tertiary water cycle which generates steam for use in a power producer. Since hot liquid sodium and water in direct contact with each other react violentyl, the integrity of the containment interface between the two fluids must be as nearly perfect as possible.

The subject invention relates solely to the arrangement of the reactor coolant circuits in relation to the nuclear fuel elements. It is in no way related to the configuration of the nuclear fuel elements, the composition of the nuclear fuel, or the moderation or control means necessary for sustaining the nuclear heat producing process. The invention is dependent upon known systems capable of producing the required nuclear reaction.

The subject invention overcomes past difficulties by division of reactor-coolant fluid flow among many parallel conduits. Each conduit contains a portion of the total number of nuclear fuel elements which are longitudinally disposed throughout the length of the conduit. The coolant fluid flows in parallel relationship with the longitudinally disposed fuel elements. A fluid coolant circuit of the recirculation type directs fluid around the fuel elements. An outer fluid coolant circuit encompasses the parallel conduits, the two fluid systems having common walls separating them.

The two systems are operated at essentially the same pressure. The outer wall of the outer system at lower temperature (e.g. 742° F.) can thereby contain the fluid pressure in the inner system at higher temperature (e.g. 1040 F.). The common walls between the two systems will be at some intermediate temperature.

Integrity of the isolation barrier which the common walls provide between systems is not dependent upon the tensile strength of the material. Thus, a relatively thin wall can be used.

The common walls between the systems protect the fluid flowing through the outer system from contamination by direct contact with the fuel elements.

Fluid recirculating in the inner conduits exchanges heat with the fluid passing through the outer circucit externally of the reactor vessel. Closed circuit heat exchange means are used in such case to isolate the fluid in one circuit from the fluid in the other circuit.

Penetration of the secondary loop within the reactor shell through the outer circuit permits the secondary loop to absorb heat directly from the products of the nuclear reaction as well as heat from the inner circuit through the common walls. This minimizes the amount of total secondary heat exchange surface required.

Where liquid sodium is the coolant, the multiple conduits permit sodium coolant fluid to be distributed more proportionately throughout the reactor core to accommodate variations in power density. The outer or secondary sodium loop incorporated in the reactor core reducees the total amount of heat exchange surface required.

The multiple conduits permit a more flexible reactor fuel assembly and moderation system arrangement.

A specific object of this invention is to providee a fluid coolant apparatus for a nuclear reactor wherein there are two systems for channelling the flow of a coolant fluid in parallel relationship with longitudinally disposed nuclear fuel elements, one system comprising parallel conduits which individually encompass portions of said nucear fuel elements and having means for flowing a portion of said coolant fluid around said nuclear fuel elements, the other system comprising means to flow the other portion of said coolant fluid around the exterior of said parallel conduits for cooling the walls of said parallel conduits receiving heat from said portion of said coolant fluid in direct contact with said nuclear fuel elements, and including means for controlling fluid flow selectively in each of said systems.

A further object is to provide an apparatus as described above wherein sodium in a liquified state is employed as the coolant fluid.

A still further object is to provide means for selectively distributing coolant fluid among the parallel conduits.

A still further object is to provide conduit and pumping means for recirculating the coolant fluid in the respective reactor fluid conduit systems.

A still further object is to provide heat exchange means in the conduit and pumping means external to the reactor to exchange heat absorbed by the coolant fluid passing through the parallel conduits with the coolant fluid passing around the parallel conduits.

A still further object is to provide a means for consuming heat absorbed by the coolant fluid within the reactor, heat consumption occurring external to the reactor.

Figure 3A:
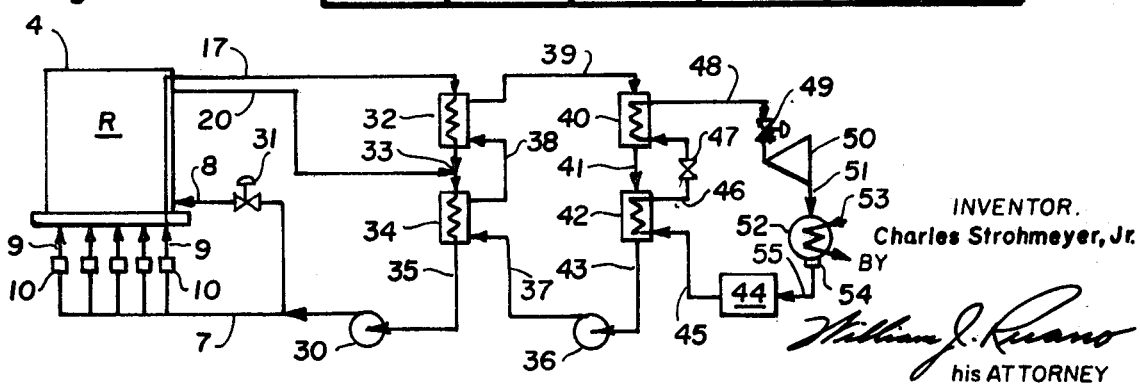
Figure 2:
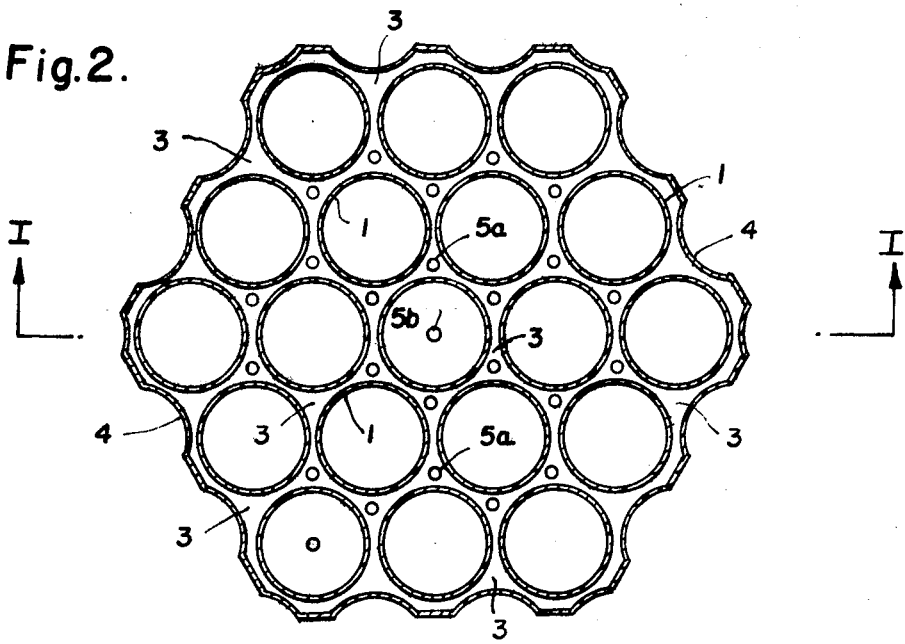

The invention will be described in detail with reference to the accompanying drawings wherein:

FIG. 1 is a representative vertical plane cross section A—A through the reactor illustrating the principles of the fluid circuit construction, FIG. 2 is a representative horizontal plane cross section B—B through the reactor illustrating the principles of the fluid circuit construction, and FIGS. 3a, b, and c illustrate various reactor coolant fluid recirculation cycle arrangements.

In FIGS. 1 and 2, a typical reactor nuclear process is intended. The description is, therefore, directed toward the unique features associated with the coolant fluid circuit and heat exchange arrangement. FIG. 2 shows a representative arrangement of the circuits in transverse cross section. Multiple parallel conduits 1 each encompass a portion of the fuel rods 2 (as shown on FIG. 1 for one circuit). Fluid flows around conduits 1 in the conduit space 3. The conduits 1 may be spaced from each other by spacer means not shown. Such spacer means should not block the flow passage through space 3. Space 3 is encompassed by shell 4. Movable control rods 5 are provided to control the nuclear process. Their insertion into the nuclear fuel core 6 retards the nuclear reaction in the fuel rods 2 transverse to their axis. The depth of insertion of control rods 5 into nuclear fuel core 6 determines the thermal power output of the reactor.

Coolant fluid as sodium in a liquified state enters the reactor through conduits 7 and 8. Conduit 7 supplies coolant fluid to conduits 1, through connecting conduits 9. Throttling means 10, as a valve, are provided in conduits 9 to proportion fluid flowing in conduit 7 selectively among conduits 1. Throttling means 10 may individually be responsive to representative temperature measurement downstream of fuel rods 2 and as shown by thermocouple 11.

Fluid entering conduits 1 flows around nuclear fuel rods 2. The discharge end of conduits 1 fits into channel block 12 which has means to isolate the fluid flowing through conduits 1 as it discharges through conduit 13 in channel block 12 to plenum 14 formed by cover 15 which is flanged and bolted to channel block 12 at 16. Coolant fluid from plenum 14 flows to the process through conduit 17.

Conduit 8 supplies coolant fluid to plenum 18 located at the base of conduits 1. Coolant fluid flows up from penum 18 through space 3 around conduits 1 cooling the conduit walls and discharges from space 3 to plenum 19 formed around conduits 13 in channel block 12. Fluid flows from plenum 19 through conduit 20 to the process.

Conduits 1 are provided with base supports 21 designed to receive a support loading from springs 22. Springs 22 are supported from the bottom of shell 4 which rests on foundation base 23. Foundation base 23 is fixed and incorporates holes for passing connecting conduits 9. Expansion joints 24 are provided in connecting conduits 9 to permit conduits 1 to react to the compression of springs 22.

Shell 4 is provided with circumferential expansion joint 25 to accommodate shell expansion between base 23 and fixed foundation 26. Anchor plates 27 are held to foundation 26 through anchor bolts 28. Shell 4 is also flanged and bolted to anchor plates 27 and channel block 12 at 29. Anchor plates 27 are located at intervals around the flange circumference.

Compression of springs 22 upon conduits 1 compress conduits 1 into channel block 12 which forms a positive seal for conduits 1 and accommodates differential expansion among conduits 1.

Control rods 5 may be located internally in conduits 1 as shown at 5b on FIG. 2. In such case a bushing not shown would be provided between control rod 5 and cover 15. The control rods 5 may be located in space 3 around conduits 1 as shown at 5a on FIG. 2. In such case a bushing not shown would be provided between control rods 5 and cover 15 and between control rods 5 and the top of channel block 12. The driving mechanism for control rods 5 is extrenal to cover 15 and is not shown.

FIG. 3a shows a complete system for utilizing heat produced in reactor R. Pump 30 supplies sodium coolant in a fluid state to conduits 1 through conduit 7 and connecting conduits 9 and to space 3 through conduit 8. Throttling valve 31 in conjunction with throttling means 10 permits selective flow proportioning of fluid among all the circuits. Conduits 1 discharge through conduit 17 to the tube side of heat exchanger 32 from whence the coolant fluid is combined at 33 with the flow of coolant fluid from space 3 after passing through conduit 20. The combined fluid passes through the tube side of heat exchanger 34 and through conduit 35 to pump 30 suction. The coolant fluid is then recirculated.

A secondary sodium recirculation cycle is provided on FIG. 3a. Pump 36 discharges through conduit 37 to the shell side of heat exchanger 34 and through conduit 38 to the shell side of heat exchanger 32. Heat flows from the primary to secondary circuits in heat exchangers 32 and 34. From heat exchanger 32, the secondary fluid flow is through conduit 39 to the shell side of heat exchanger 40, through conduit 41 to the shell side of heat exchanger 42, through conduit 43 to the suction of pump 36 which recirculates the secondary coolant fluid.

A tertiary steam and water cycle is provided on FIG. 3a. Feedwater cycle 44 includes means for regenerative feedwater heating and pumping means to raise water pressure to the working pressure of the tubular steam generator in heat exchanger 42. Fluid is passed from feedwater cycle 44 to the steam generator through conduit 45. From the steam generator fluid passes through conduit 46 and throttling valve 47 to the tubular superheater in heat exchanger 40. Steam discharge from the superheater passes through conduit 48, the turbine steam admission control valves 49 to the inlet of the turbine 50. Steam from the turbine 50 exhausts through conduit 51 to condenser 52. Water circulating through conduit 53 condenses the steam which collects in hotwell 54 from whence it passes to feedwater cycle 44 through conduit 55 for recirculation through the cycle.

Heat in the secondary sodium cycle is transferred to the tertiary steam and water cycle in heat exchangers 40 and 42.

Figure 3B:
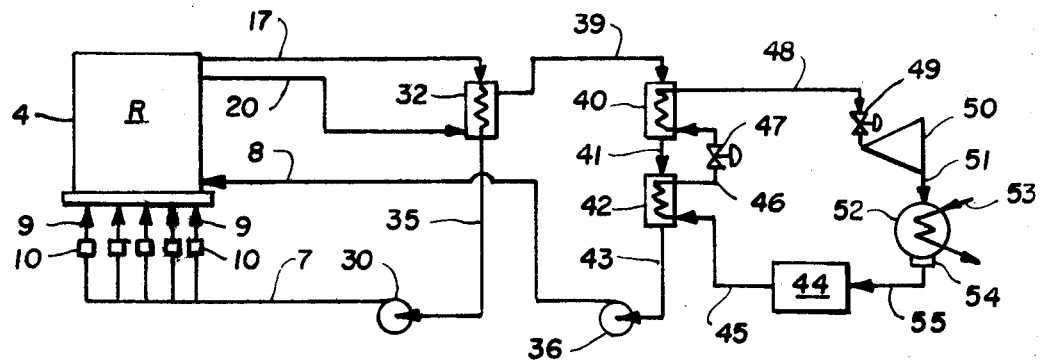

FIG. 3b is a modification of the 3a system. The same description applies to the like identification numbers except as noted. In this case conduit 7 is fed coolant fluid from pump 30 and conduit 8 is fed coolant fluid from pump 36. The primary sodium coolant fluid loop includes conduits 1 only in the reactor R. The secondary sodium cycle includes conduit 8, plenum 18, space 3, plenum 19 and conduit 20 which connects to the shell side of heat exchanger 32 in place of conduit 38 as shown in FIG. 3a. In FIG. 3b, heat exchanger 34 and conduits 37 and 38 are eliminated. Pump 36 discharges direct to conduit 8.

In FIG. 3b, introduction of the secondary sodium cycle within the reactor in space 3, reduces the heat exchange surface required external to reactor R. The secondary sodium cycle is protected against contamination from the fuel elements 2 by the walls of conduits 1. In such a manner, mass flow rates can be controlled separately in the primary and secondary sodium cycles. The fluid flowing through space 3 can be maintained at a proper temperature level suitable for cooling the primary circuit walls within the reactor structure by controlling the water temperature entering the steam generator in heat exchanger 42 from conduit 45.

Figure 3C:
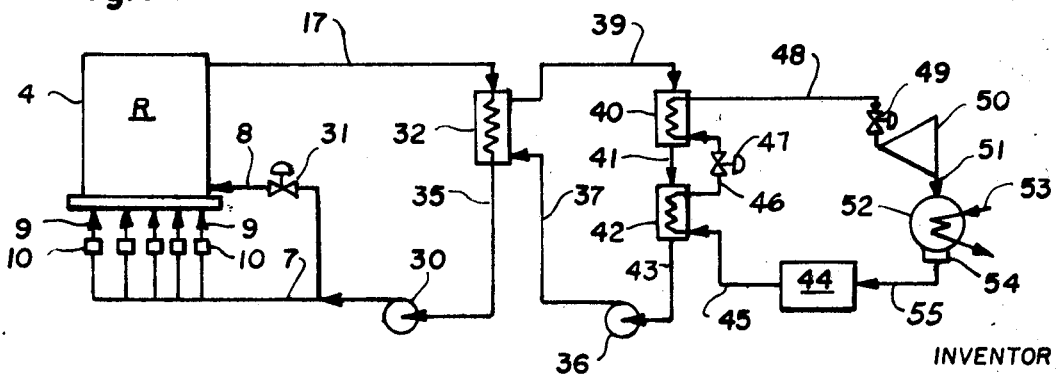

FIG. 3c is another modification of FIG. 3a. In FIG. 3c the fluid discharging from space 3 and conduits 1 are combined in conduit 17. FIG. 1 may, thus, be simplified. Channel block 12 would then become a structure where space 3 and conduit 13 both discharge into plenum 14. Plenum 19 and conduit 20 are eliminated. Conduits 33 and 38 are eliminated. Heat exchanger 34 is combined with heat exchanger 32. Pump 36 discharges through conduit 37 directly to the shell of heat exchanger 32.

Features of sodium cycle cleanup may be as shown on FIG. 2 of co-pending United States patent application Ser. No. 653,475 filed July 14, 1967, upon which FIGS. 1, 2 and 3b of this application filed are readable.

Thus, it will be seen that I have provided an efficient embodiment of my invention whereby a means is provided for improving circulation of coolant fluid flow through a nuclear reactor, wherein two conduit systems are provided for channelling the flow of a collant fluid in parallel relationship with longitudinally disposed nuclear fuel elements, one system having multiple conduits flowing fluid in direct contact with the nuclear fuel elements and the other system cooling the multiple conduits of the first system and including means for controlling fluid flow selectively in each system, wherein the coolant fluid is sodium in a liquified state, wherein there is selective control of fluid flow among the multiple conduits, wherein conduit and pumping means are provided to recirculate coolant fluid flow, wherein external heat exchange means are provided external to the reactor circuits, and wherein heat consuming means are provided to dissipate heat in the coolant fluid absorbed from the nuclear reaction.

I claim:
1. A fluid coolant apparatus for a nuclear reactor wherein there are two coolant systems for channelling the flow of sodium in a liquified state in parallel relationship with longitudinally disposed nuclear fuel elements, one coolant system comprising parallel conduits which individually encompass portions of said nuclear fuel elements are having means for flowing a significant amount of said liquified sodium around said nuclear fuel elements, the other coolant system comprising means to flow another significant amount of said liquified sodium around the exterior of said parallel conduits for cooling the walls of said parallel conduits receiving heat from said liquified sodium in direct contact with said nuclear fuel elements, and including means for controlling the flow rate of said liquified sodium selectively in each of said systems.

2. A fluid coolant apparatus as recited in claim 1 wherein said means for controlling the flow rate of said liquified sodium includes means for selectively distributing said liquified sodium among said parallel conduits of said one coolant system.

3. A fluid coolant apparatus as recited in cdlaim 1 wherein conduit and a common pumping means are provided for flowing and recirculating said liquified sodium in both of said coolant systems.

4. A fluid coolant apparatus as recited in claim 1 whereing separate fluid pumping and conduit means are provided for flowing and recirculating said liquified sodium in each of said coolant systems.

5. A fluid coolant apparatus as recited in claim 3 wherein there is a third liquified sodium coolant system in heat exchange with said liquified sodium discharging from said one and said other coolant systems through closed circuit heat exchange means, said third system being provided with a means for consuming heat and pumping and conduit means to recirculate liquified sodium serially through said closed circuit exchange means and said means for consuming heat.

6. A fluid coolant apparatus as recited in claim 4 wherein said liquified sodium in said one system is in heat exchange with said liquified sodium in said other system external to said nuclear reactor through closed circuit heat exchange means, said conduit means for said other system also including means to consume heat.

References Cited
UNITED STATES PATENTS

| | | | |
|---|---|---|---|
| 2,770,591 | 11/1956 | Wigner et al. | 176—63 |
| 2,832,733 | 4/1958 | Szilard | 176—52 |
| 3,071,527 | 1/1963 | Young | 176—52 |
| 3,079,321 | 2/1963 | Oppenheimer et al. | 176—52 |
| 3,167,481 | 1/1965 | Collins et al. | 176—30 |
| 3,208,913 | 9/1965 | Henning | 176—20 |
| 3,212,975 | 10/1965 | Fletcher et al. | 176—20 |
| 3,313,708 | 4/1967 | Angelini et al | 176—52 |
| 3,369,972 | 2/1968 | Seymour | 176—19 |
| 3,389,053 | 6/1968 | Chamberlain et al. | 176—40 |

CARL D. QUARFORTH, Primary Examiner

H. E. BEHREND, Assistant Examiner

U.S. Cl. X.R.

176—61, 65